United States Patent [19]

Jang

[11] Patent Number: 5,626,533

[45] Date of Patent: May 6, 1997

[54] HYDRAULIC CONTROL SYSTEM OF AN AUTOMATIC TRANSMISSION USED IN A VEHICLE

[75] Inventor: Jaeduk Jang, Kyungki-do, Rep. of Korea

[73] Assignee: Hyundai Motor Company, Rep. of Korea

[21] Appl. No.: 554,371

[22] Filed: Nov. 8, 1995

[30] Foreign Application Priority Data

Nov. 9, 1994 [KR] Rep. of Korea ............... 94-29308
Nov. 9, 1994 [KR] Rep. of Korea ............... 94-29310

[51] Int. Cl.$^6$ ............................................. F16H 59/00
[52] U.S. Cl. ........................... 475/129; 475/128; 477/130; 477/150
[58] Field of Search .................... 475/128, 129; 477/130, 150

[56] References Cited

U.S. PATENT DOCUMENTS 4,870,877  10/1989  Hasegawa et al. ............ 477/132 X
5,366,420  11/1994  Kuriyama et al. ............. 475/129
5,507,706  4/1996  Jang et al. ................... 477/138 X

*Primary Examiner*—Charles A. Marmor
*Assistant Examiner*—Nathan O. Jensen
*Attorney, Agent, or Firm*—Finnegan, Henderson, Farabow, Garrett & Dunner, L.L.P.

[57] ABSTRACT

A hydraulic control system of an automatic transmission, which includes a line pressure regulator for regulating the hydraulic pressure supplied from an oil pump to the hydraulic control line, and a shift structure for selectively delivering the regulated hydraulic pressure to the friction elements, wherein the shift structure further comprises a manual valve operatively linked with a shift lever for delivering the regulated hydraulic pressure according to shift ranges, a plurality of solenoid valves controlled on/off by a transmission control unit to control the friction elements, a first to a fifth pressure control valves for simultaneously controlling both releasing and connecting end of the friction elements, a first-to-second shift valve for making a port change by the hydraulic pressure flowing out from the pressure control valves to deliver the pressure to the friction elements, a forward drive clutch release valve, a second-to-third shift valve, and a reverse drive clutch valve.

6 Claims, 10 Drawing Sheets

|   |   | C1 | C2 | C3 | B1 | B2 | B3 | E/B |
|---|---|----|----|----|----|----|----|-----|
|   | P |    |    |    |    |    |    | X   |
|   | R |    |    | O  | O  |    |    | O   |
|   | N |    |    |    | O  |    |    | X   |
| D | 1 | O  |    |    | O  |    |    | O   |
|   | 2 | O  |    |    |    | O  |    | O   |
|   | 3 | O  | O  |    |    |    |    | O   |
|   | 4 |    | O  |    |    | O  |    | O   |
|   | 5 |    | O  |    |    |    | O  | O   |

|              | S1  | S2  | S3  | S4  | S5  |
|--------------|-----|-----|-----|-----|-----|
| First Speed  | OFF | ON  | ON  | ON  | OFF |
| Second Speed | OFF | OFF | ON  | ON  | OFF |
| Third Speed  | OFF | OFF | OFF | OFF | OFF |
| Fourth Speed | ↑   | OFF | ON  | OFF | OFF |
| Fifth Speed  | ↑   | OFF | OFF | OFF | ON  |
| REV          | —   | —   | —   | OFF | —   |

5,626,533

1

HYDRAULIC CONTROL SYSTEM OF AN AUTOMATIC TRANSMISSION USED IN A VEHICLE

BACKGROUND OF THE INVENTION

1. Field of the Invention

The present invention concerns a hydraulic control system of an automatic transmission for a vehicle.

2. Description of Prior Art

The automatic gearshift of a vehicle is carried out by selectively associating the friction elements such as clutches, brakes, etc. with the sun gears, planetary gears, and ring gears of the planetary gear units. To this end, a transmission control unit TCU is provided to control such association. The power train of the automatic transmission generally employs a one-way clutch for providing a rotational member with a reaction force under the control of the hydraulic control system.

However, such one-way clutches are designed to perform the gearshifts in sequence very limiting the shifting responsiveness. Namely, it is impossible to make a skip shift from the third to the fifth speed or vice versa, which delays the shifting responsiveness. Besides, the one-way clutches complicate the structure of the power train.

SUMMARY OF THE INVENTION

The object of the present invention is to provide a hydraulic control system of an automatic transmission with a means for improving the shifting responsiveness together with simplifying the structure of the power train.

According to an embodiment of the present invention, a hydraulic control system of an automatic transmission comprises a line pressure regulator for regulating the hydraulic pressure supplied from an oil pump to the hydraulic control line, and a shift structure for selectively delivering the regulated hydraulic pressure to the friction elements, wherein the shift structure further comprises a manual valve operatively linked with a shift lever for delivering the regulated hydraulic pressure according to shift ranges, a plurality of solenoid valves controlled on/off by a transmission control unit to control the friction elements, a first to a fifth pressure control valves for simultaneously controlling both releasing and connecting end of the friction elements, a first-to-second shift valve for making a port change by the hydraulic pressure flowing out from the pressure control valves to deliver the pressure to the friction elements, a forward drive clutch release valve, a second-to-third shift valve, and a reverse drive clutch valve.

The present invention will now be described with reference to the drawings attached only by way of example.

2

Figure 6:
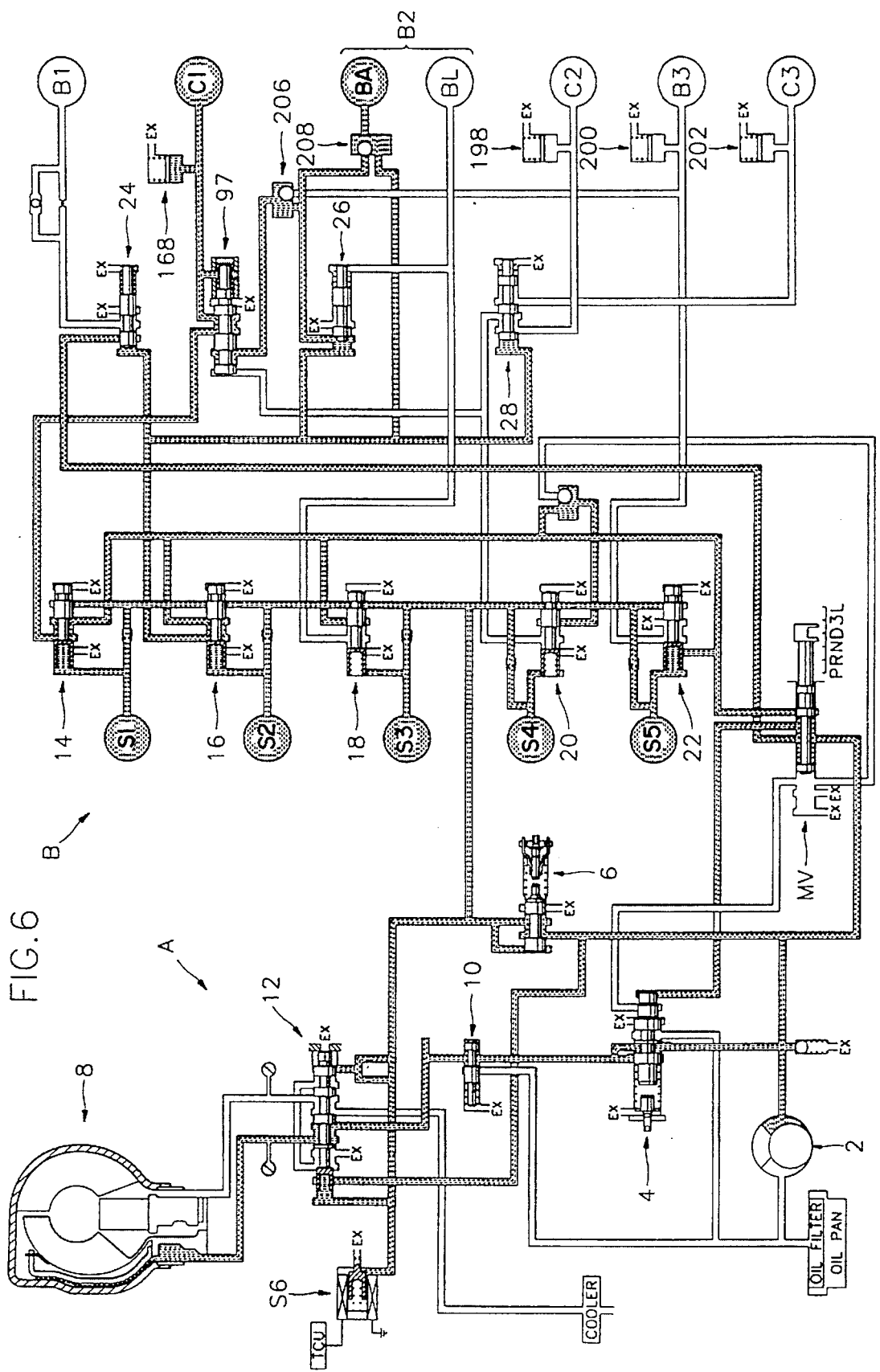
Figure 7:
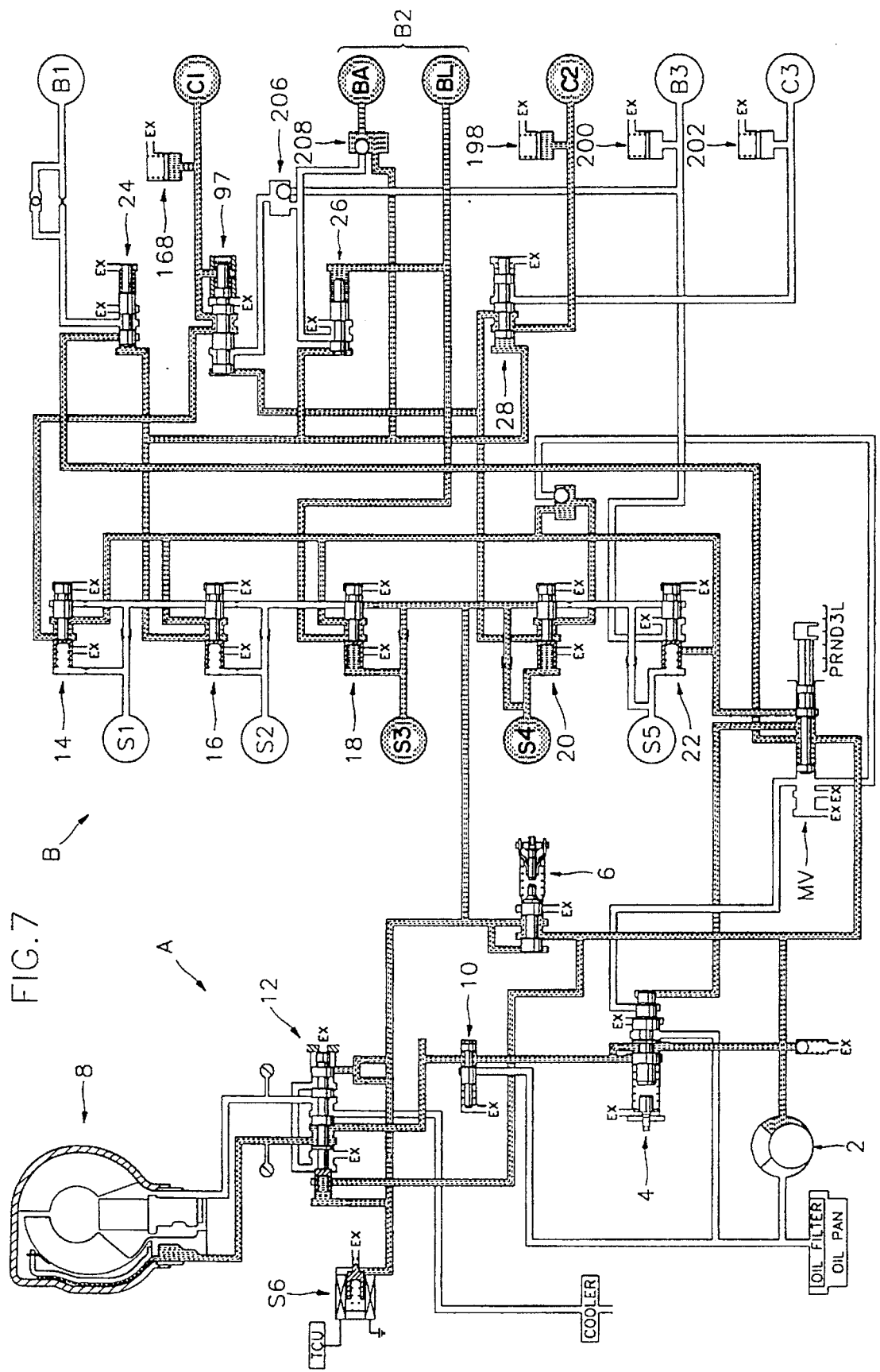
Figure 8:
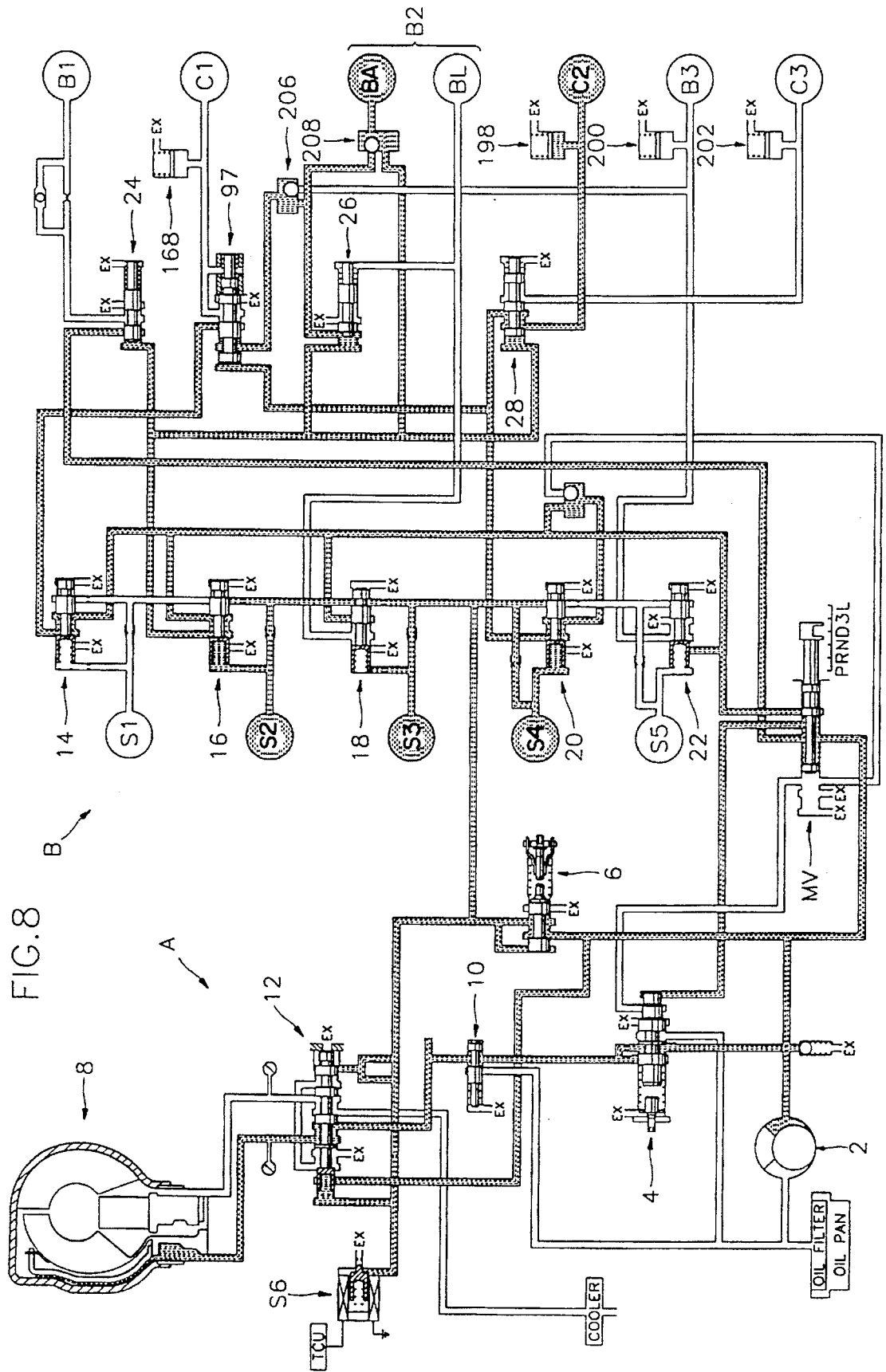
Figure 9:
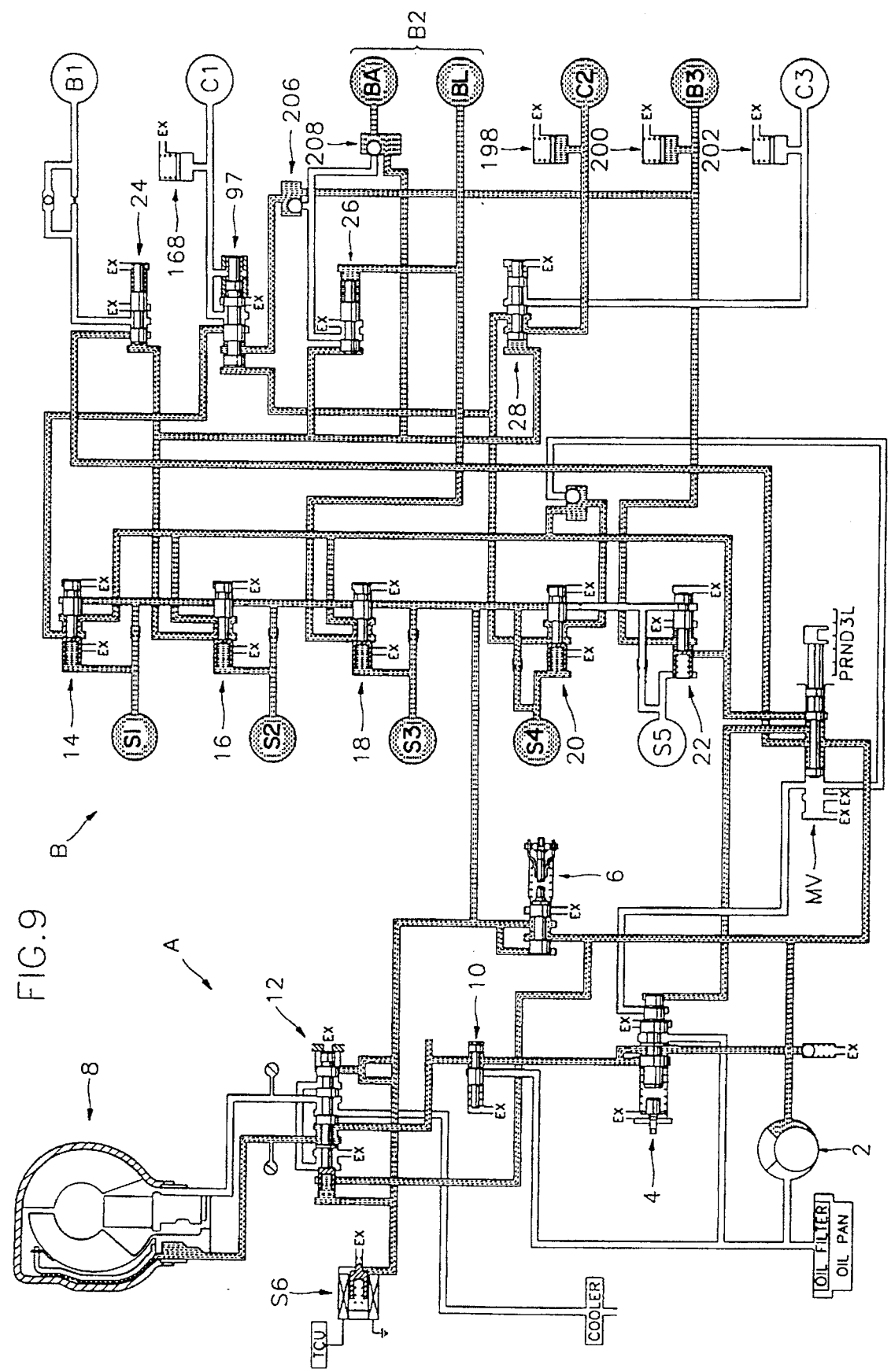
Figure 10:
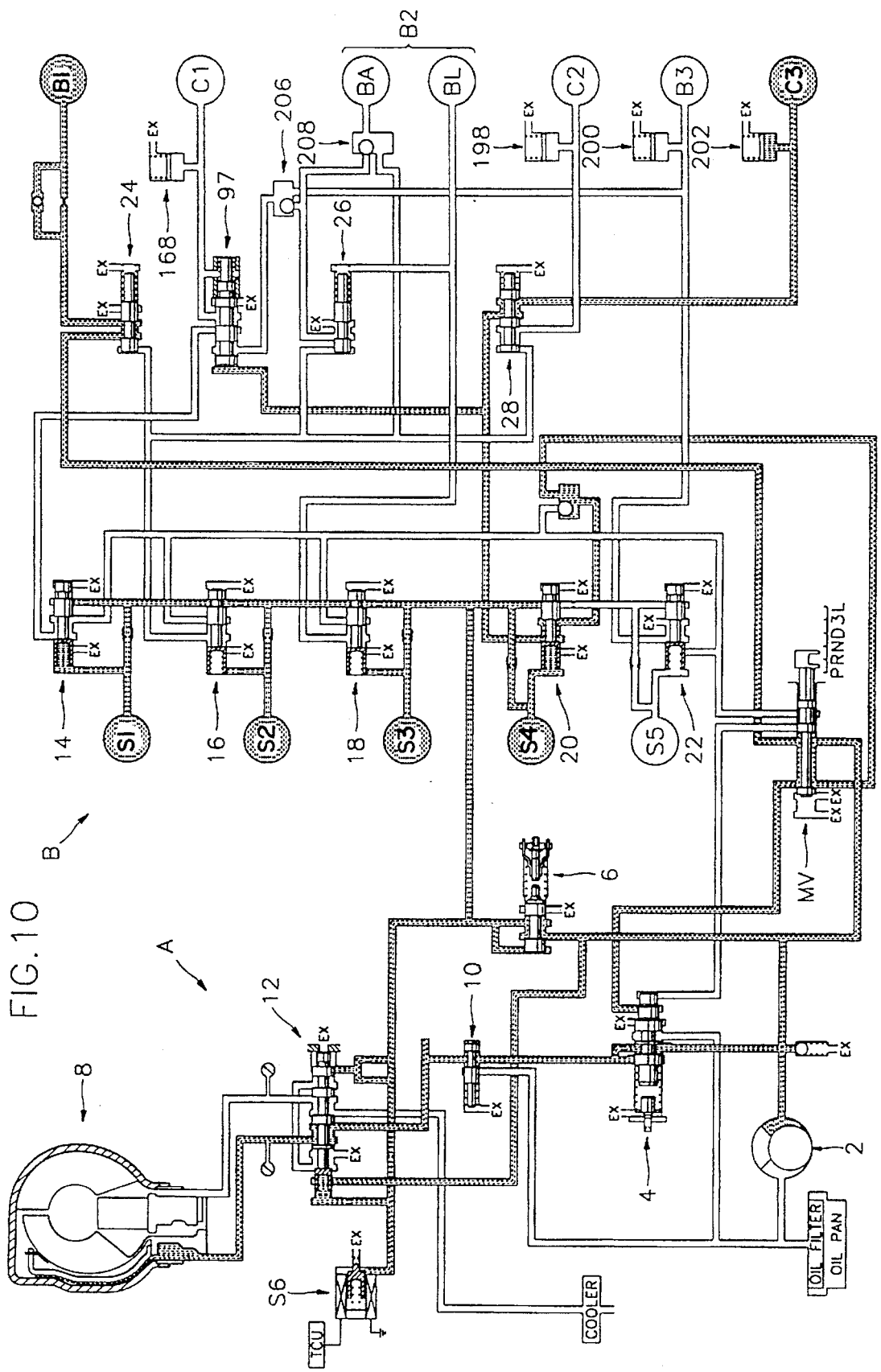
Figures 11, 12, 13:
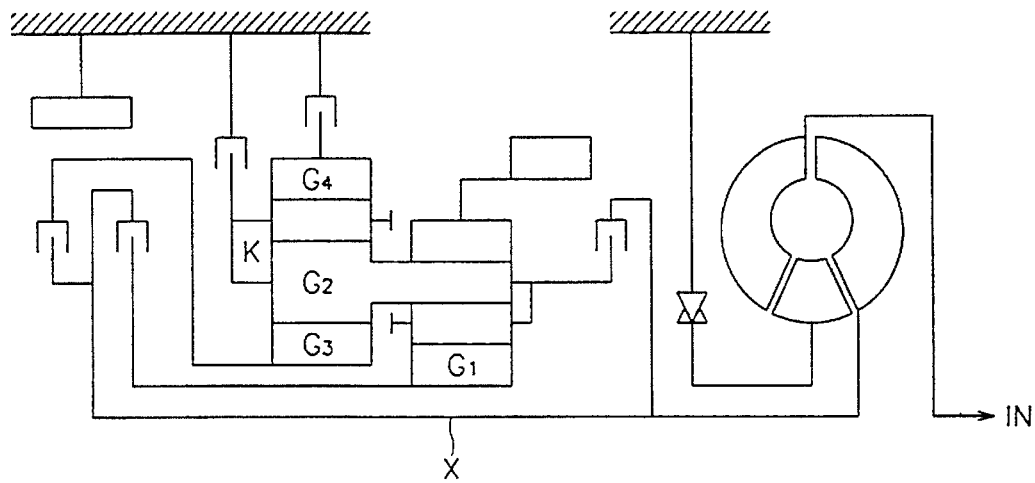

FIG. 6 is a schematic diagram for illustrating the hydraulic control circuit in the second speed of "D" range;

FIG. 7 is a schematic diagram for illustrating the hydraulic control circuit in the third speed of "D" range;

FIG. 8 is a schematic diagram for illustrating the hydraulic control circuit in the fourth speed of "D" range;

FIG. 9 is a schematic diagram for illustrating the hydraulic control circuit in the fifth speed of "D" range;

FIG. 10 is a schematic diagram for illustrating the hydraulic control circuit in the reverse "R" range;

FIG. 11 is a schematic diagram for illustrating the power train controlled by the inventive hydraulic control system; and FIG. 12 is a table to show the working state of the friction elements controlled by the inventive hydraulic control system according to the shift stages; and FIG. 13 is a table to show the working state of the solenoid valves controlled by the inventive hydraulic control system according to the shift stages.

DETAILED DESCRIPTION OF PREFERRED EMBODIMENTS

Figure 1:
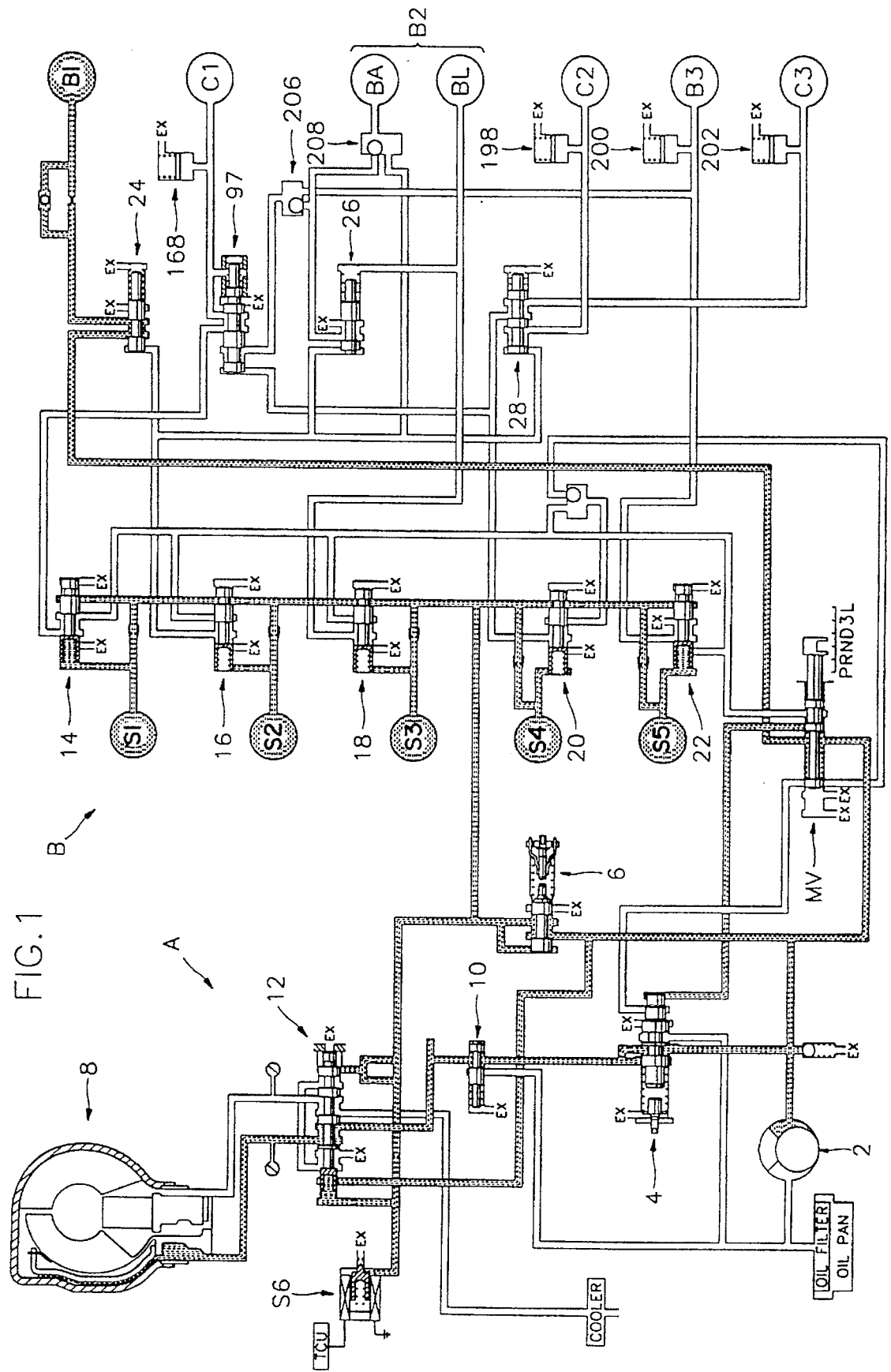
FIG. 1 is a schematic diagram for illustrating a hydraulic control system according to an embodiment of the present invention.
Figure 2:
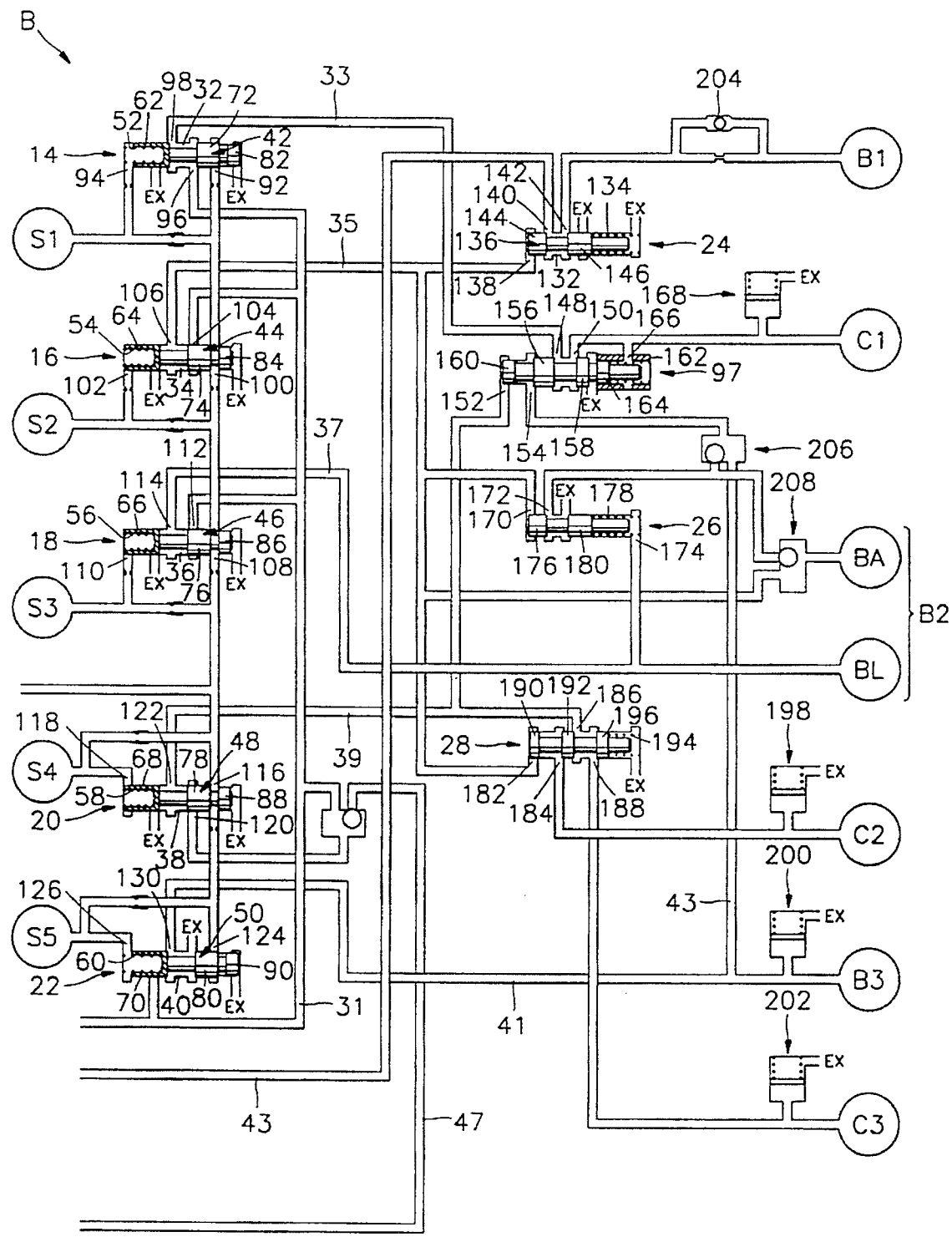
FIG. 2 is a detailed diagram for illustrating the shift structure of FIG. 1.

Referring to FIG. 1, there is shown a manual valve disposed in the neutral position N. The hydraulic control system according to the present embodiment comprises a line pressure regulation part "A" for regulating the hydraulic pressure supplied from an oil pump 2 to be suitable to a gearshift, and a shift part "B" for selectively deliver the pressure of the line pressure regulation part to the friction elements.

The line pressure regulation part includes the oil pump 2, a regulator valve 4 for regulating the hydraulic pressure produced by the oil pump, a reducing valve 6 for producing a pressure lower than the line pressure, a torque converter control valve 10 for controlling the damper clutch installed in the torque converter to improve the power transfer efficiency of the torque converter, and a damper clutch control valve 12. The shift part "B" includes a first to fifth pressure control valve 14, 16, 18, 20, 22, a first-to-second shift valve 24, a second-to-third shift valve 26, and a reverse clutch valve 28. The five pressure control valves communicate via the reducing valve 6 and a line part 30 having the same structure, which includes a valve spool 42, 44, 46, 48, 50, and a spool cavity 32, 34, 36, 38, 40 for receiving the valve spool.

The valve spool has a plug 62, 64, 66, 68, 70 with the left side resiliently supported by a spring 52, 54, 56, 58, 60, a first land 72, 74, 76, 78, 80 formed at a given distance from the plug, and a second land 82, 84, 86, 88, 90 formed at a given distance from the first land. The spool cavity 32 has a first port 92 for receiving the pressure of the line part 30, a second port 94 for forming or releasing a hydraulic pressure by a first solenoid valve S1 controlled on/off by the transmission control unit, a third port 96 for receiving the line pressure supplied from the manual valve MV through a line part 31, and a fourth port 98 for delivering the line pressure through a line part 33 to the forward drive clutch release valve 97.

The spool cavity 34 of the second pressure control valve 16 includes a first port 100 for receiving the pressure of the line part 30, a second port 102 for forming or releasing the pressure by means of a second solenoid valve S2 controlled on/off by the transmission control unit, a third port 104 for receiving the line pressure via the line part 31, and a fourth port 106 for delivering the line pressure to the reverse drive clutch valve 28.

The spool cavity 36 of the third pressure control valve 18 has a first port 108 for receiving the pressure of the line part 30, a second port 110 for forming or releasing the pressure by means of a third solenoid valve S3 controlled on/off by the transmission control unit, a third port 112 for receiving the line pressure of the line part 31, and a fourth port 114 for delivering the line pressure through a line part 37 to the second-to-third shift valve 26.

The spool cavity 38 of the fourth pressure control valve 20 hag a first port 116 for receiving the pressure of the line part 30, a second port 118 for forming or releasing under the on/off control of the transmission control unit, a third port 120 for receiving the line pressure of the line part 31, and a fourth port 122 for delivering the line pressure via a line part 39 to the reverse drive clutch valve 28 and the forward drive clutch release valve 97.

The spool cavity 40 of the fifth pressure control valve 22 includes a first port 124 for receiving the pressure of the line part 30, a second port 126 for forming or releasing under the on/off control of the transmission control unit, a third port 128 for receiving the line pressure via the line part 31, and a fourth port 130 for delivering the line pressure through a line part 41 to the forward drive clutch release valve 97.

The first-to-second shift valve 24 has a spool cavity 132 formed in the valve body, and a valve spool 136 resiliently supported by spring 134 so as to move to the left or right side in the spool cavity 132. The spool cavity 132 has a first port 138 for receiving the pressure of the line part 35, a second port 140 for receiving the pressure of the line part 43 in the neutral or reverse drive range N or R, and a third port 142 for delivering the pressure of the second port to the first friction element B1. The valve spool 136 has a first land 144 for receiving the pressure of the first port 138, and a second land 146 resiliently supported by a spring 134.

The forward drive clutch release valve 97 has a first port 148 receiving the pressure from the fourth port 98 of the first pressure control valve 14 through the line part 33, a second port 150 for delivering the pressure of the first port 148 to the second friction element C1, a third port 152 for receiving the pressure from the fourth port 122 of the fourth pressure control valve 20 through the line part 39, and a fourth port 154 for receiving the pressure from the fourth port 106 of the second pressure control valve 16 through the second-to-third shift valve 26.

The valve spool of the forward clutch release valve 97 has a first and a second land 156 and 158 for respectively blocking the first and the second port 148 and 150, a third land 160 for receiving the pressure of the third port 152, and a fourth land 164 resiliently supported by a spring 162. In addition, there is provided an opening 166 for delivering the pressure to the right side of the fourth land 164, so that the valve spool is moved to the left side to work the second friction element C1 even with the left side of the third land 160 receiving the pressure. Between the forward drive clutch release valve 97 and the second friction element C2 is provided an accumulator 168 to temporarily accumulate the pressure applied to the second friction element in order to prevent the second friction element from abrupt working. The accumulator has a conventional structure that comprises a piston for receiving the hydraulic pressure and a spring mounted to the side opposite to the hydraulic pressure to resist the hydraulic pressure, of which a detailed description is omitted.

The second-to-third shift valve 26 has a first port 170 for communicating via the line part 35 with the fourth port 106 of the second pressure control valve 16, a second port 172 for delivering the pressure of the first port to the working chamber of the third friction element B2, and a third port 174 for communicating with the fourth port 114 of the third pressure control valve to deliver the release chamber of the third friction element. The valve spool of the second-to-third shift valve 26 has a first land 176 for receiving the pressure of the first port 170, and a second land 180 resiliently supported by a spring 178.

The reverse drive clutch valve 28 has a first port 182 for receiving the pressure of the fourth port 106 of the second pressure control valve 16, a second port 184 for delivering the pressure of the first port to the third friction element C2, a third pore 186 for receiving the pressure of the fourth port 122 of the fourth pressure control valve 20, and a fourth port 188 for delivering the pressure of the third port to the reverse friction element C3. The valve spool of the reverse drive clutch valve 28 has a first land 190 for receiving the pressure of the first port 182, a second land 192 positioned between the second and the third port, and a third land 196 resiliently supported by a spring 194.

The line part 41 communicating with the fourth port 130 of the fifth pressure control valve 22 is designed to directly deliver the pressure to the fourth friction element B3, and via another line part 43 to the fourth port 154 of the forward clutch release valve 97. Also provided in the line parts for delivering the working pressure to the third and fourth friction elements and the reverse drive friction element are accumulators to prevent the friction elements from abrupt working. The reference numeral 204 represents a check valve, and 206 and 208 shuttle valves.

Figure 3:
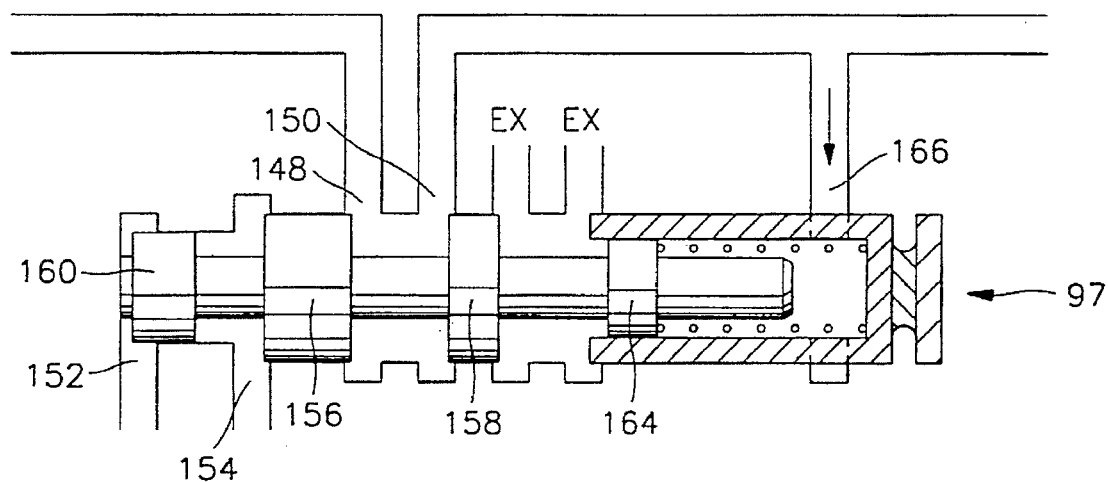
FIG. 3 is a schematic diagram for illustrating the working of the forward drive clutch of FIG. 1 when delivering a hydraulic pressure to a friction element.
Figure 4:
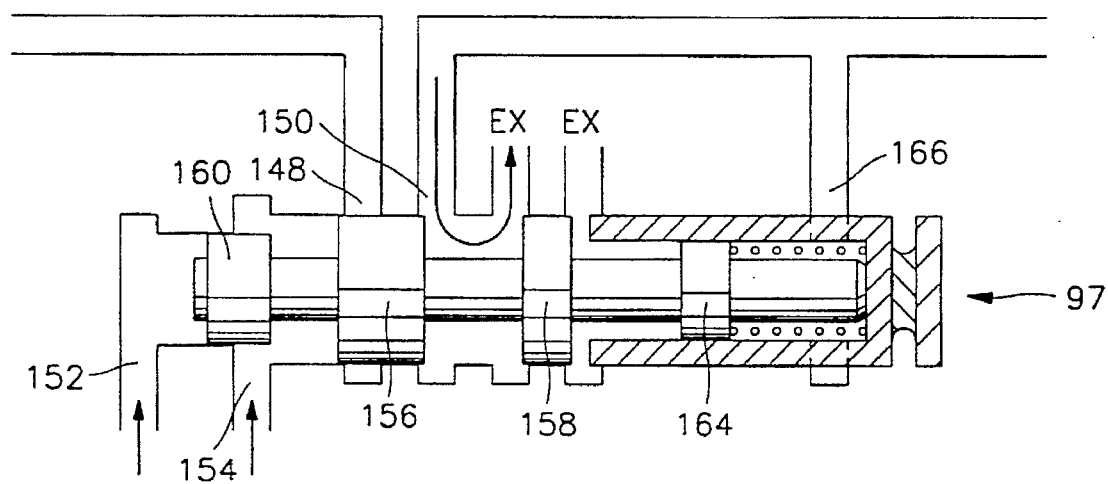
FIG. 4 is a schematic diagram for illustrating the working of the forward drive clutch of FIG. 1 when releasing the pressure.

Referring to FIGS. 3 and 4, the forward drive clutch release valve 97 is designed to be controlled by the hydraulic pressure supplied to the second friction element C2, and by the fourth and fifth working pressure. This facilitates the control of a power train subjected to the control of two reaction forces.

The inventive hydraulic control system may be applied to control a power train including at least one planetary gear unit as shown in FIG. 11, whose shift control mechanism will be described with reference to FIGS. 5 to 10. The shifting procedures may be explained with reference to FIGS. 11 and 13.

Figure 5:
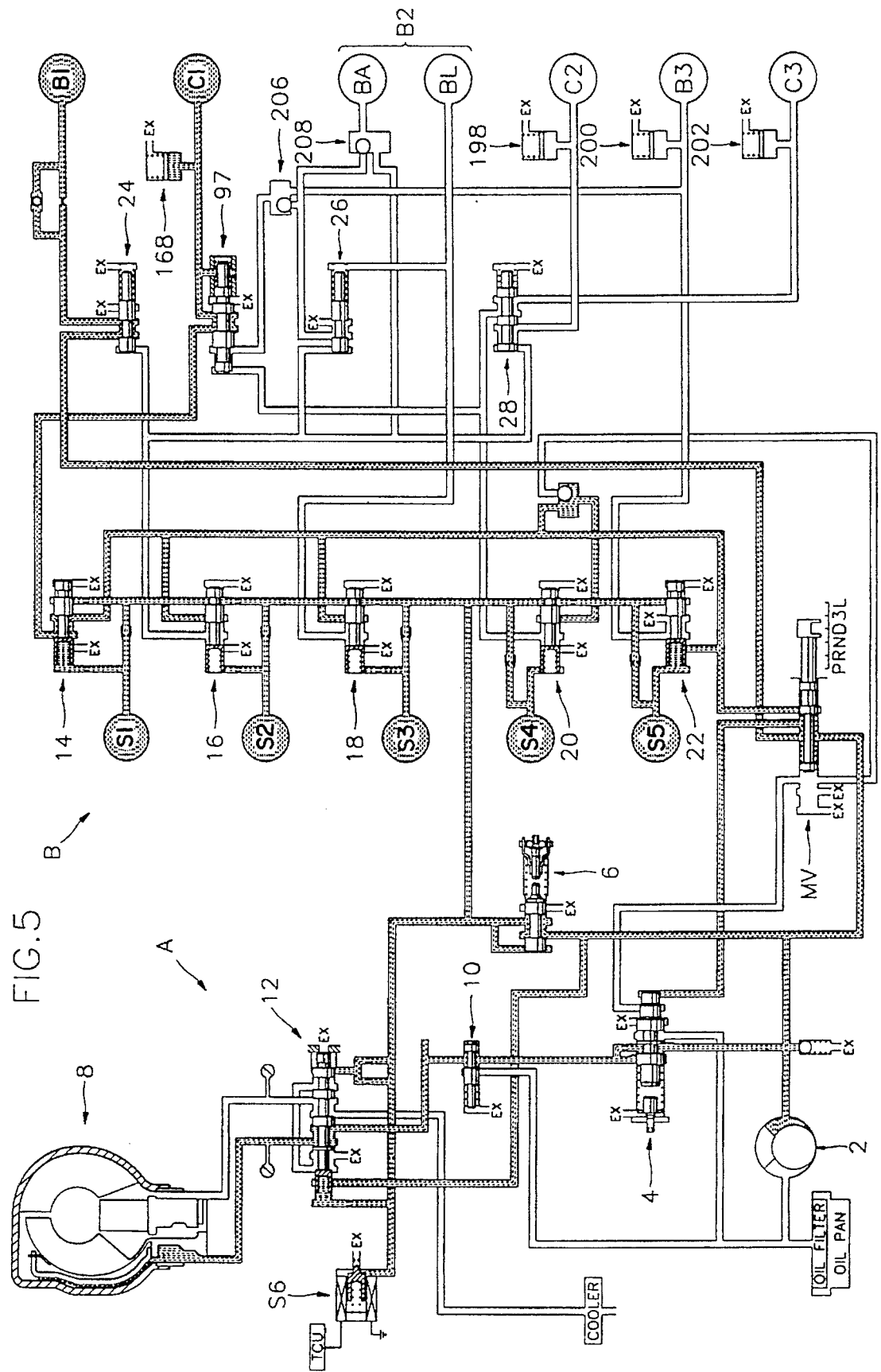
FIG. 5 is a schematic diagram for illustrating the hydraulic control circuit in the first speed of "D" range.

FIG. 5 illustrates that the manual valve MV has made a mode change from the neutral range N as shown in FIG. 1 to the drive range D, completing the first speed gearshift. The procedure of the forward drive first speed shift begins by the hydraulic pressure produced by the oil pump 2 flowing through the line part 43 into the second port 140 of the first-to-second shift valve 24. In this case, the first-to-second shift valve 24 has already been moved to the left side with reference to the drawing, the pressure supplied to the second port 140 is delivered through the third port 142 to the first friction element B1. The first solenoid valve S1 is turned off by the transmission control unit to form the pressure in the second port 94 of the first pressure control valve 14, moving the valve spool 42 to the right side to make the third and the fourth port 96 and 98 communicate.

However, when the manual valve is in the forward drive range, the line part 31 is provided with a hydraulic pressure, which flows into the third port 96 of the first pressure control valve 14 delivered via the fourth port 98 to the line part 33. The pressure of the line part 33 in turn is delivered to the first port 148 of the forward clutch release valve 97, which has already been moved to the left side by the resilient force of the spring 162 so as to deliver the pressure of the first port through the second port 150 to the second friction element C1. Thus, the first forward speed is obtained by the working of the first and second friction elements B1 and C1, where the first friction element B1 receives a hydraulic pressure in the neutral range, and therefore the second friction element C1 is additionally worked.

Then, the engine torque transferred to the input shaft X of the transmission is delivered to the sun gear G1 to rotate the integral planetary gear G2, thus subjecting the planetary carrier K of the planetary gear G2 to the torque. The power train as shown in FIG. 11 is one of the examples controlled by the inventive hydraulic control system, which is conventional and a detailed description is omitted. The first friction element B1 may serve as a reaction element to check the rotation of the planetary carrier K, thus making the use of one-way clutch unnecessary. The working pressure supplied to the second friction element C1 is temporarily accumulated by the accumulator 168 so as to prevent abrupt gearshift.

If the vehicle speed is increased from the first speed, the transmission control unit controls the first and the second solenoid valve S1 and S2 off, so that the first port 138 of the first-to-second shift valve 24 is supplied with the pressure with the second friction element C1 kept on receiving the working pressure, thus blocking the second and the third port 140 and 142. Hence, the first friction element B1 is not supplied with the working pressure. In this case, the pressure applied to the first friction element B1 is discharged via a discharge port Ex.

The pressure flowing into the first port 138 of the first-to-second shift valve 24 is produced through the line part 31 because the second solenoid valve S2 to control the second pressure control valve 16 is turned off to make the third and the fourth port 104 and 106 communicate. This pressure controls the first-to-second shift valve 24 to prevent the first friction element from working, flowing into the first port 170 of the second-to-third shift valve 26 to push the valve spool to the right side so as to make the first and the second port 170 and 172 communicate. Hence, the working chamber of the third friction element B2 is supplied with the pressure. Thus, the second and the third friction element C1 and B2 are worked to obtain the second forward speed, when the second port 154 of the forward clutch release valve 97 is supplied with the pressure to work on the left side of the first land 156, as shown in FIG. 6. Hence, as shown in FIG. 11, the first friction element B1 is released to set the planetary carrier K free from being checked and to work the friction element B2, which prevents the sun gear G3 from rotating so as to make the sun gear serve as a reaction element.

Increasing the vehicle speed from the second forward speed, transmission control unit, as shown in FIG. 6, controls all the solenoid valves S1, S2, S3, S4, S5 off to move all the valve spools of the first, second, third, fourth, and fifth pressure control valves to the right side with reference to the drawing. Hence, the pressure of the line part 31 becomes to flow into the third port 96, 104, 112, 120, 128 of all the pressure control valves, so that the second friction element C1 keeps on working, while the release chamber of the third friction element B2 is supplied with the pressure, thus preventing the third friction element from working.

In addition, the pressure delivered through the reverse drive clutch valve 28 to the fourth friction element C2 is delivered from the fourth port 122 of the fourth pressure control valve 20 through the line part 39 to the third port 186 of the reverse drive clutch valve, in turn applied to the fourth friction element C2 since the pressure from the second pressure control valve 16 flows into the first port 182 of the reverse clutch valve moving the valve spool to the right side, as shown in FIG. 7. In this way, the third friction element B2 is released from working, and the fourth friction element C2 is worked, and therefore, two input elements are established in the planetary gear unit as shown in FIG. 11.

Increasing the vehicle speed from the third forward speed, the transmission control unit turns only the third solenoid valve S3 on, thus blocking the third and the fourth port 112 and 114 of the third pressure control valve 18, as shown in FIG. 8. This causes the release chamber pressure of the third friction element B2 to be blocked so as to work the third friction element, while the pressure from the fourth port 106 of the second pressure control valve 16 flows through the line part 35 delivered through the first port 182 of the reverse clutch valve 28 to the second port 184 to the fourth friction element C2. Hence, the fourth forward speed control is completed.

In this case, the pressure supplied to the second friction element C1 is discharged, since the forward drive clutch release valve 97 has the third port 152 applied with the control pressure via the fourth pressure control valve 20, so that the valve spool is moved to the right side as shown in FIG. 4 thus opening the discharge port Ex. In addition, the second land 66 blocks the first port 148, preventing two friction elements from be engaged simultaneously. This fourth speed control, as shown in FIG. 11, employs the planetary carrier K as the input element and the sun gear G3 as the reaction element, causing a friction element to serve as a reaction element.

Increasing the vehicle speed from the fourth forward speed, the transmission control unit turns the fifth solenoid valve 85 on and the third solenoid valve S3 off so as to deliver the pressure to the release chamber of the third friction element B2 to release, as shown in FIG. 9. While the fourth friction element C2 keeps on working, the pressure supplied from the fourth port 130 of the fifth pressure control valve 22 is directly delivered to the fifth friction element B3, and through the line part 43 to the fourth port 154 of the forward drive clutch release valve 97 to move the valve spool to the right side so as to prevent the pressure from being supplied to the second friction element C1. In this way, the fifth forward speed control is accomplished. Of course, the power train has the ring gear G4 checked by a friction element to serve as a reaction element.

Changing the position of the manual valve MV to the reverse drive range R causes the fourth solenoid valve S4 to turn off, as shown in FIG. 10, making the third port 120 of the fourth pressure control valve be supplied with the pressure through the reverse drive line part 47. On the other hand, the fourth solenoid valve is turned off to move the valve spool to the right side, so that the pressure flowing into the third port is delivered through the fourth port 122 to the third port 186 of the reverse drive clutch valve 28. In this case, since the valve spool of the reverse drive clutch valve is moved to the left side by means of the spring 194, the third and the fourth port communicate to deliver the pressure to the reverse friction element C3. Meanwhile, the pressure of the line part 43 flows into the second port 140 of the first-to-second shift valve 24, finally delivered through the third port 142 to the first friction element B1, so that the planetary carrier K is prevented from rotating, and the reverse friction element C3 is worked to make the sun gear G3 serve as an input element, thus reversely rotating the transfer drive gear T.

Until now is described the shifting operation concerning the five forward speeds and a reverse speed. Hereinafter will be described the skip shifting operation to make the shift response fast.

When making a skip shift from the fifth forward speed to the third forward speed, all the solenoid valves are turned off to keep the working of the fourth friction element C2, to prevent the fifth friction element B3 from working, and to work the second friction element C1. Likewise, in order to make a skip shift from the fourth speed to the second speed, the third friction element B3 is kept on working, the fourth friction element C2 prevented from working, and the second friction element C1 worked.

Besides, the present embodiment has the range of the manual valve represented as "P", "R", "N", "D", "3", "L", where the "D" range provides the maximum fifth forward speed, and the "3" range the maximum third forward speed. Hence, the manual shift is accomplished by moving the shift lever. In addition, the "L" range provides the maximum second forward speed, so that it is possible to make the skip shift to the second speed by moving the shift lever. Although the manual shift may be accomplished according to the position of the shift lever, it is also possible to automatically make a skip shift under the control of the transmission control unit as shown in the above description because the pressure control valves are independently controlled. Furthermore, the line pressure is applied to the forward drive clutch release valve in the fourth and fifth speeds, so that the valve spool is moved to discharge the hydraulic pressure to accomplish the first, second and third forward speed, thus preventing two friction elements from being engaged to achieve a safe shift control.

What is claimed is:

1. A hydraulic control system of an automatic transmission comprises a line pressure regulator for regulating hydraulic pressure supplied from an oil pump to a hydraulic control line, and a shift structure for selectively delivering the regulated hydraulic pressure to friction elements, wherein said shift structure further comprises a manual valve operatively linked with a shift lever for delivering the regulated hydraulic pressure according to shift ranges, a plurality of solenoid valves controlled on/off by a transmission control unit to control the fraction elements, a first, second, third, fourth, and a fifth pressure control valve for simultaneously controlling both releasing and connecting of said friction elements, a first-to-second shift valve for making a port change by the hydraulic pressure flowing out from said pressure control valves to deliver the pressure to said friction elements, a forward drive clutch release valve, a second-to-third shift valve, and a reverse drive clutch valve.

2. A hydraulic control system as defined in claim 1, wherein an accumulator is provided in a line part from one of the pressure control valves for delivering a working pressure to temporarily accumulate the working pressure in order to prevent abrupt pressure flow.

3. A hydraulic control system as defined in claim 1, wherein said pressure control valves respectively have a first port for working a pressure smaller than the line pressure, a second port for working a pressure smaller than the line pressure with turning off of the solenoid valve, a third port for receiving the line pressure, and a fourth port for discharging the line pressure.

4. A hydraulic control system as defined in claim 1, wherein said forward drive clutch release valve has a first port for communicating with said first pressure control valve, a second port for delivering the pressure of said first port to the second friction element, and a third port for communicating with said fourth pressure control valve to receive the pressure.

5. A hydraulic control system as defined in claim 1, wherein said forward drive clutch release valve receives a hydraulic pressure in the fourth and fifth speeds to move the valve spool to discharge the working pressures oft he first, second and third forward speeds.

6. A hydraulic control system as defined in claim 5, wherein said forward drive clutch release valve has an opening to receive the working pressure of one of said friction elements as the control pressure of the valve spool in the first, second and third forward speeds.

* * * * *